United States Patent [19]

Zwick

[11] Patent Number: 4,536,365
[45] Date of Patent: Aug. 20, 1985

[54] PROCESS FOR THE MANUFACTURE OF EQUALLY BIAXIALLY ORIENTED FILM

[75] Inventor: Maurice M. Zwick, Stamford, Conn.

[73] Assignee: American Cyanamid Company, Stamford, Conn.

[21] Appl. No.: 564,456

[22] Filed: Dec. 22, 1983

[51] Int. Cl.³ .............................................. D01F 11/00
[52] U.S. Cl. .................................... 264/558; 264/182;
264/210.7; 264/289.6; 264/290.2; 264/559;
264/564; 264/565
[58] Field of Search ............... 264/558, 559, 564, 565, 264/182, 210.7, 289.6, 290.2

[56] References Cited

U.S. PATENT DOCUMENTS

| T857,013 | 12/1968 | Jennings | 528/391 |
|---|---|---|---|
| 3,257,490 | 6/1966 | Hovermale et al. | 264/290.2 |
| 3,280,234 | 10/1966 | Osborn | 264/564 |
| 3,551,540 | 12/1970 | Pellicciari et al. | 264/569 |
| 3,551,546 | 12/1970 | Gosper et al. | 264/290.2 |
| 3,659,000 | 4/1972 | Cronk | 264/564 |
| 3,821,343 | 6/1974 | Sudo | 264/565 |
| 4,112,034 | 9/1978 | Nash et al. | 264/565 |
| 4,140,740 | 2/1979 | De Smedt et al. | 264/290.2 |
| 4,279,580 | 7/1981 | Hayashi et al. | 264/290.2 |
| 4,301,112 | 11/1981 | Zwick | 264/564 |
| 4,354,997 | 10/1982 | Mizutani et al. | 264/564 |
| 4,388,258 | 6/1983 | Hungerford | 264/210.7 |
| 4,415,720 | 11/1983 | Rose | 528/391 |
| 4,442,147 | 4/1984 | Schirmer | 264/176 R |

FOREIGN PATENT DOCUMENTS

| 0042016 | 9/1983 | Japan | 264/564 |
|---|---|---|---|
| 0866822 | 5/1961 | United Kingdom | 264/559 |

Primary Examiner—Jeffery Thurlow
Assistant Examiner—Patrick Dailey
Attorney, Agent, or Firm—Frank M. Van Riet

[57] ABSTRACT

Equally biaxially oriented film is produced by extruding liquified polymer in tubular form, orienting the tubular film in the radial direction only and then either (1) equally orienting the radially oriented film in the longitudinal direction and drying the resultant equally biaxially oriented film while preventing any shrinkage thereof or (2) orienting the radially oriented film in the longitudinal direction to a degree less than said radial orientation but equal to the radial orientation remaining after the biaxially oriented film undergoes radial shrinkage upon drying thereof in the absence of radial shrinkage control and drying the resultant biaxially oriented film in the absence of radial shrinkage control.

3 Claims, 2 Drawing Figures

PROCESS FOR THE MANUFACTURE OF EQUALLY BIAXIALLY ORIENTED FILM

BACKGROUND OF THE INVENTION

The production of biaxially oriented films of such film-forming polymers as acrylonitrile homopolymers and copolymers is taught in U.S. Pat. No. 4,301,112. The process disclosed in said patent provides for the simultaneous stretching of extruded polymeric tubular films in both the radial and longitudinal direction. However, it has been found that it is almost impossible to obtain equal molecular orientation in both planes of the film utilizing such a simultaneous orientation approach. The difficulty of controlling extensional deformations so as to produce such highly desirable films exhibiting equal biaxial orientation is documented in an article by Gupta etal; Polymer Engineering and Science, February 1982, Vol. 22, No. 3, pgs. 172–181. Accordingly, it would satisfy a long-felt need if a process could be devised which would enable the production of equally biaxially oriented films.

THE DRAWINGS

SUMMARY OF THE INVENTION

Figure 1:
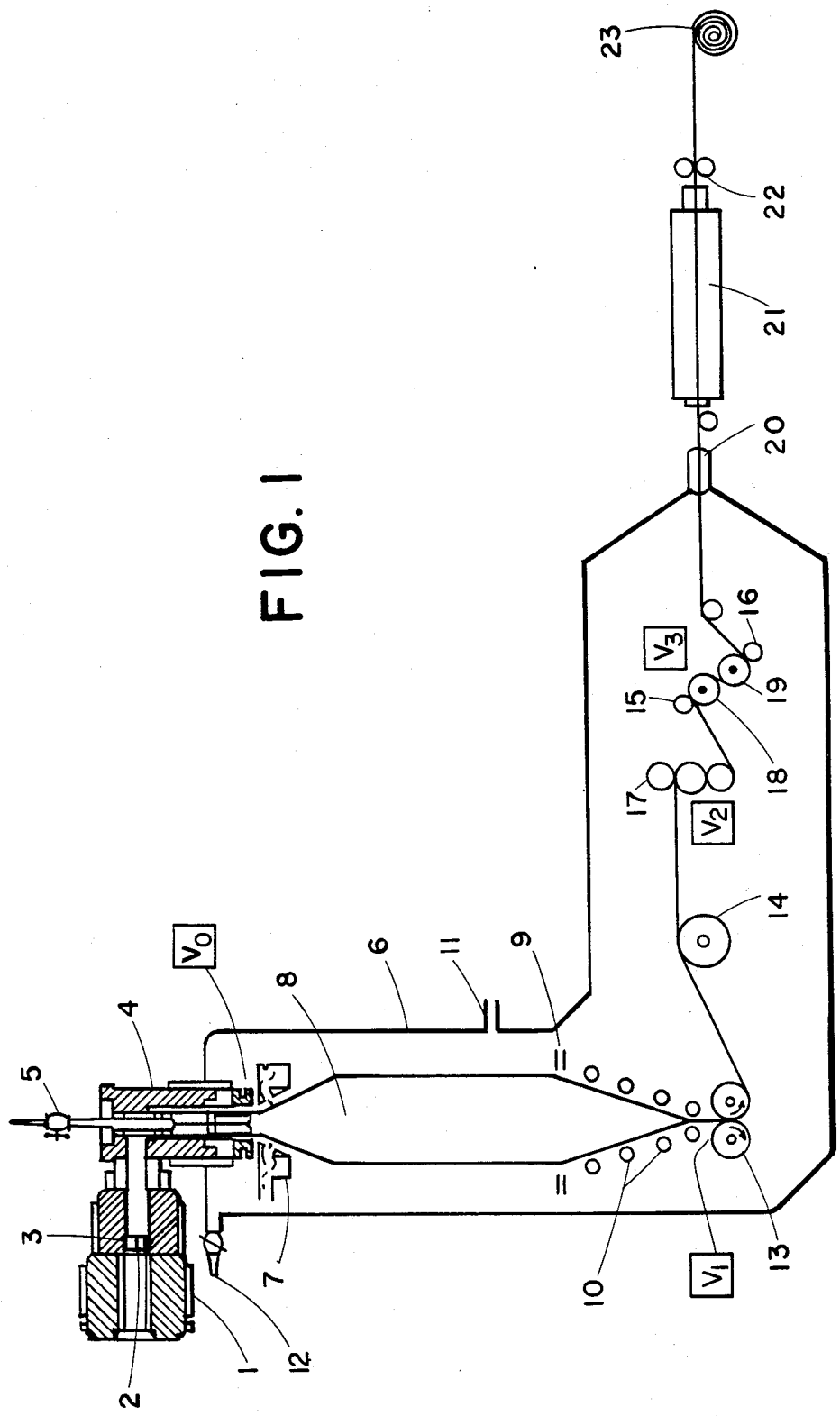
FIG. 1 represents a schematic diagram of suitable equipment for conducting the process of the present invention wherein two stages of stretch are conducted within a pressurized solidification zone.

A process has been devised whereby equally biaxially oriented films are produced from film forming polymers. The orientation is conducted within a pressurized solidification zone in two stages, the first comprising a radial orientation and the second comprising a longitudinal orientation. The radial orientation is conducted essentially in the absence of longitudinal orientation and the longitudinal orientation is conducted either to the same degree as the radial orientation or to a lesser degree depending upon the drying step which follows thereafter. If the drying step is conducted under conditions of shrinkage prevention, the longitudinal orientation is equivalent to the radial orientation. If, however, the drying is conducted under conditions which allow radial shrinkage, the longitudinal orientation (or stretch) is less than the radial orientation (or stretch) to an extent substantially equal to the radial orientation remaining after the biaxially oriented film undergoes radial shrinkage upon drying in the absence of radial shrinkage control.

Accordingly, the present invention, enables one to better control the film making process to the extent that films having substantially equal molecular orientation in the direction of both axes of the plane are recovered. Such films are highly desirable since equal biaxial orientation causes the film to exhibit maximum strength in all directions. The prior art systems which employ purely nominal settings of equal mechanical stretch in both directions are dependent upon the preciseness thereof and, as a rule, fail to result in equal molecular orientation in both directions. Additionally, when employing one feature of the instant process, as described above, the need for a tenter frame during drying (shrinkage prevention) is obviated. The use of a tenter frame is a disadvantage both operationally and from the aspect of capital investment. The instant process enables the film to exit the solidification zone with an over orientation in the radial direction so as to allow for subsequent radial shrinkage during drying.

DESCRIPTION OF THE INVENTION INCLUDING PREFERRED EMBODIMENTS

The process of the present invention is directed to the production of equally biaxially oriented barrier films which process comprises preparing a liquified film-forming polymer, extruding said liquid film-forming polymer through an annular die directly into a pressurized solidification zone to form a tubular film and orienting said tubular film essentially in the radial direction only by introducing vapor under pressure into the interior of said tube while minimizing orientation in the longitudinal direction. The radially oriented tube is subsequently either (1) equally oriented in the longitudinal direction, the radial and longitudinal orientations both being conducted within said pressurized solidification zone and dried while preventing any shrinkage thereof or (2) oriented in the longitudinal direction to a degree less than the said radial orientation thereof and equal to the radial orientation remaining after the resultant biaxially oriented tubular film undergoes radial shrinkage upon drying thereof in the absence of radial shrinkage control and then dried in the absence of radial shrinkage control. In either instance, the substantially equally biaxially oriented film is then recovered for use.

The process of the present invention, employing either longitudinal orientation procedure, results in the formation of a highly desirable polymer film which is oriented substantially equally in both film directions i.e. both axes of the film plane. As indicated above, the radial orientation of the barrier films is achieved by the introduction of vapor into the interior of the extruded tubular film under pressure such that the ratio of the inside diameter of the tubular film to the inside orifice diameter of the annulus is usually about 3.0 or more. The longitudinal orientation of the film is achieved by the stretch provided by roller assembly 17 of FIG. 1 of the drawings in conjunction with rollers 18 and 19. The prevention of longitudinal orientation during the radial orientation is achieved by adjusting the tension at roll seal 13 to an operationally tolerable minimum. The biaxial orientation is in the plane of both surfaces and is readily measured by the method described in U.S. Pat. No. 3,275,612. While the films of the present invention are referred to herein as equally biaxially oriented, it is, of course, from a practical standpoint, almost impossible to achieve exact equality of the radial and longitudinal stretch. Therefore, when used herein, the term "equally biaxial orientation" etc. is meant to include radial and longitudinal variations, one from the other, of up to about 25%, preferably, up to about 10%.

The process of the present invention, in preferred embodiments, operates advantageously using polymer in liquified form at a solids content in the range of up to about 70–80% while providing films with isotropic mechanical properties in all directions of the plane of the film through biaxial orientation of its polymer chains.

In carrying out processing in accordance with the present invention, a liquified, film-forming polymer is employed, the liquified polymer being obtained by use of a polymer solvent alone or in conjunction with one or more melt assistants. A polymer solvent, of course, when used in proper proportions and under proper conditions will completely dissolve the polymer and provide a liquified composition capable of extrusion at ordinary pressures. Melt-assistants are compositions which are either non-solvents for the polymer or are polymer solvents used in proportions inadequate to dissolve the polymer under normal conditions of temperature and pressure. As indicated, melt-assistants and polymer solvents may be used, in accordance with the present invention, in combination, if desired.

Liquified polymers may be obtained for use in the process hereof by providing a polymer melt using a suitable combination of solvent and melt-assistant at elevated temperatures and pressure. It is generally desirable to employ a polymer solvent as plasticizer and melt-assistant in conjunction with processing since such use generally results in better structure of the film. In this connection, it should be noted, that to provide a melt, the proportion of polymer solvent, or polymer solvent-melt assistant mixture employed, should be insufficient to molecularly dissolve the polymer. Useful polymer solvents generally include organic substances which are in liquid form in use, e.g. dimethyl formamide; propylene carbonate; salt solutions; acid solutions and mixtures. Non-solvents for the polymer may also be used in appropriate instances as melt-assistants in conjunction with the polymer solvents. Non-solvents may include water, low boiling alcohols, and other organic liquids, preferably miscible with the polymer solvent or mixtures thereof.

Suitable polymers for use in the present invention (including polymer blends) comprise polysulfones, e.g. those having the formula:

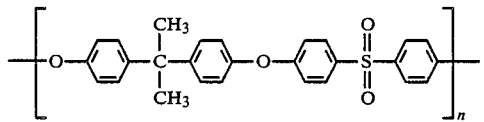

wherein n is 20–100, polyimides, polyamides, polycarbonates, polyesters, cellulose derivatives such as methyl cellulose, ethyl cellulose, cellulose acetate, and the like; vinyl polymers and co-polymers, such as acrylonitrile polymers and copolymers, poly(vinyl alcohol), poly(vinyl pyrrolidone), polyolefins and the like.

The liquified polymer composition may also contain various additives such as liquid and/or solid filler components as a separate disperse phase; lubricants; antistatic agents; pigments; reinforcing microfibrils; and the like. Also present may be inert gases such as air and nitrogen as well as reactive gases such as sulfur dioxide, carbon dioxide, ammonia, and the like.

In carrying out processing to provide the tubular film in accordance with the present invention, the procedure followed when a melt-assistant is used with a solvent to obtain the liquified polymer will be an assisted melt spinning process as described in U.S. Pat. No. 4,301,112, issued Nov. 17, 1981 to M. Zwick, and hereby incorporated herein by reference, except for variations as described herein.

Referring to FIG. 1, representing a generalized embodiment of the present invention, there is shown apparatus and processing according to the present invention. A spinning head 1 is shown through which liquified polymer is extruded through a filter 2 and a circular die 4 which contains breaker plate 3 inlet 5 for entry of compressed gas or vapor into the center of the annulus. The film 8 which forms at the lip of the die is inflated by gas or vapor pressure introduced therein via inlet 5 causing the film to stretch radially. The nascent film is contained within the confines of a solidification zone 6 which is pressurized with vapor or gas entering at 11, the pressure therein being controlled by valve 12. Vapor ring 7 is optional and can supply auxiliary heating to prevent cooling of the nascent film due to evaporation of liquid therefrom. A tubular film is thus created which is then optionally contacted with a quench 9 and conducted by flattening guides 10 to form a flattened tube which passes through roll seal 13 which seals the bottom of the expanded tube against leakage of internal pressure. The flattened tubular film is then passed over roll 14. Longitudinal stretch (orientation) is then applied to the film by first adjusting guide roll 17 to keep the flattened film taught. Stretching is accomplished via rolls 18 and 19, in conjunction with nip rolls 15 and 16, to equalize the orientation achieved radially. Since the film is now equally biaxially oriented, it is necessary to dry the film at drier 21 which incorporates e.g., a tenter frame operating under suitable conditions to prevent any film shrinkage. The film exits the solidification zone through seal 20. Tension rolls 22 move the film through the tenter frame to final wind-up roll 23 at controlled windup speed. Provision (not shown) is also made to slit the flattened tubular membrane to provide a planar version thereof. This procedure provides biaxial stretching to the film. When the longitudinal stretch applied to the already radially oriented film via rolls 18 and 19 is less than the degree of radial orientation already applied, drying of the film in drier 21 can be achieved without radial shrinkage control, the degree of shrinkage being equivalent to the amount of excessive radial orientation previously applied to the film vis-a-vis the longitudinal orientation.

Figure 2:
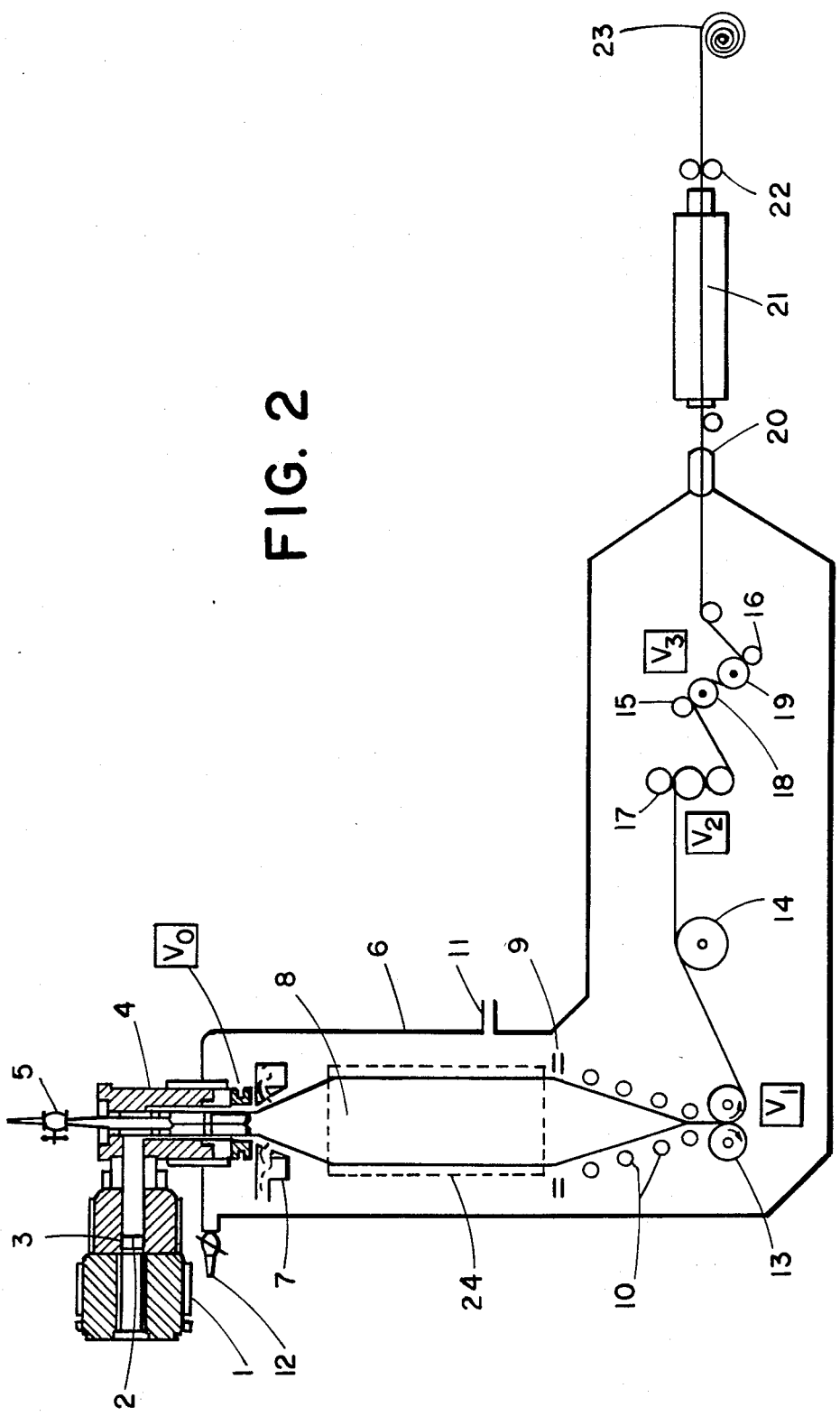
FIG. 2 represents a similar schematic diagram of suitable equipment useful in the present invention whereby the radial orientation (stretching) is controlled by a barrier sleeve.

Referring to FIG. 2, representing another specific embodiment of the present invention, the apparatus of FIG. 1 has been modified so that the tubular film is formed with the confines of a perforated restraining cage 24 presetting the maximum diameter inflation as well as the degree of orientation the film can be given.

In achieving the dual stretching and orientation of the film in accordance with the present invention, referring particularly to FIG. 1 of the drawings, separate control of the radial orientation is accomplished by setting $V_1 \simeq V_o$ and setting the pressure inside the film tube higher than the steam pressure in the solidification zone. $V_2$ is then set slightly higher than $V_1$ to keep the flattened film taught. Setting $V_3 > V_2$ and substantially equal to the radial stretch (or slightly less if the film is to be allowed to shrink during drying) then equalizes the orientation in both directions i.e. radially and longitudinally. Molecular orientation can be measured by birefringence, modulus in either direction or other representative measurements, such as X-ray diffraction as described in U.S. Pat. No. 3,275,612. When $V_1 \simeq V_o$ the nozzle design of the spinnerette should be varied so that the ring shaped slot directs the liquified polymer sideways or at an angle instead of vertically into the solidification zone.

The invention is more fully illustrated in the examples which follow wherein all parts and percentages are by weight unless otherwise specified.

EXAMPLE 1

Using the apparatus shown in FIG. 1, a tubular film is prepared from a liquified polymer supplied by a single screw extruder having a diameter of ¾ inch. The polymer is composed of repeating units derived from 85% acrylonitrile and 12% methyl methacrylate grafted onto a preformed poly(vinyl alcohol) which is used in an amount of 3% of the repeating units in the final composition. The polymer has a weight average molecular weight of about 56,000. The extruder feed consists of 70% of polymer, 22% propylene carbonate and 8% water. The melt is extruded into solidification zone 6 which is filled with saturated steam at 105° C. introduced at 11. The extrusion die used has a diameter of ⅛ inch and a die width of 15 mils. The melt temperature is 135° C. and the feed rate is 5 grams per minute. The nascent film is drawn down at a linear rate of 1 meter per minute. Air, under pressure, is introduced into the center of the tubular film via inlet 5 at sufficient pressure to radially orient the film by expanding the diameter thereof by a factor of four. The tension applied to the film at roll seal 13 is very low. After quenching the resultant membrane with a fine cold water spray at 9, the tube is flattened by passing flattening guides 10.

The film passes over roll 14 and is taken up slightly by roll 17 to maintain tautness. Rolls 18 and 19 apply longitudinal stretch to the film equivalent to the radial stretch applied in the first step i.e. $V_3/V_2=4$. The biaxially oriented film is then removed from the solidification zone through seal 20, dried in tenter frame drier 21 while preventing any shrinkage thereof and recovered on wind-up roll 23. The resultant barrier film is equally oriented in the direction of both axes of the plane of the film.

EXAMPLE 2

The procedure of Example 1 is again followed in every material detail except that the radial stretch is larger than $V_3/V_2$ roughly by the amount of radial shrinkage in the drier 21 where the film is allowed to shrink without radial constraint. The product is similar to that obtained in Example 1, except for its somewhat lower stiffness and greater toughness.

EXAMPLE 3

Example 1 is repeated in every material detail except that the polymer melt is composed of a commercially available polysulfone, known as UDEL® P-1800 a product of the UNION CARBIDE Co., 18% dimethyl formamide and 6% formamide. The extrusion temperature is 160° C., the take-away speed is 1 meter per minute, and the radial blow expansion ratio is 3.0. Similar results of biaxial orientation are achieved.

EXAMPLE 4

Example 3 is repeated in every material detail except that the polymer melt contains a blend of polymers. The melt composition is as follows: 70% polysulfone, as in Example 3,6% poly(vinyl pyrrolidone), GAF K-40®, a product of the GAF Co., 22% dimethyl formamide and 2% water. Examination of the resulting films verifies equal biaxial orientation.

We claim:

1. A process for preparing an equally biaxially oriented barrier film which comprises preparing a liquified film-forming polymer, extruding said liquified film-forming polymer through an annular die directly into a pressurized solidification zone to form a tubular film, orienting said tubular film essentially in the radial direction only by introducing vapor under pressure into the interior of said tube while minimizing orientation in the longitudinal direction, orienting said radially oriented tubular film in the longitudinal direction, said radial and longitudinal orientations being conducted within said pressurized solidification zone, said longitudinal orientation being less than said radial orientation and equal to the radial orientation remaining after the biaxially oriented tubular film undergoes radial shrinkage upon drying thereof in the absence of radial shrinkage control, drying said biaxially oriented film in the absence of radial shrinkage control and recovering the resultant equally biaxially oriented film.

2. A process according to claim 1 wherein said polymer is an acrylonitrile polymer.

3. A process according to claim 1 wherein said polymer is a polysulfone.

* * * * *